US006959364B2

(12) United States Patent
Safranek et al.

(10) Patent No.: US 6,959,364 B2
(45) Date of Patent: Oct. 25, 2005

(54) PARTIALLY INCLUSIVE SNOOP FILTER

(75) Inventors: Robert J. Safranek, Portland, OR (US); Kai Cheng, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 464 days.

(21) Appl. No.: 10/186,490

(22) Filed: Jun. 28, 2002

(65) Prior Publication Data

US 2004/0003184 A1 Jan. 1, 2004

(51) Int. Cl.[7] .............................................. G06F 12/00
(52) U.S. Cl. ..................... 711/146; 711/141
(58) Field of Search ...................... 711/118, 141, 146

(56) References Cited

U.S. PATENT DOCUMENTS

| | | | |
|---|---|---|---|
| 6,088,769 A | | 7/2000 | Luick et al. |
| 6,338,122 B1 | * | 1/2002 | Baumgartner et al. ...... 711/141 |
| 6,374,331 B1 | | 4/2002 | Janakiraman et al. |
| 6,868,481 B1 | * | 3/2005 | Gaither et al. .............. 711/119 |
| 6,892,282 B2 | * | 5/2005 | Hass et al. ................... 711/146 |
| 6,895,477 B2 | * | 5/2005 | Hass et al. ................... 711/146 |

FOREIGN PATENT DOCUMENTS

| | | |
|---|---|---|
| EP | 0 817 074 A1 | 1/1998 |
| WO | WO 01/29674 A1 | 4/2001 |

OTHER PUBLICATIONS

Scott et al., "Performance of Pruning-Cache Directories for Large-Scale Multiprocessors", IEEE Transaction on Parallel and Distributed Systems, V. 4 N. 5. May 1, 1993, pps 520-534.
U.S. Appl. No., pending, 09/643,382, filed Aug. 21, 2000, to Khare et al.

* cited by examiner

Primary Examiner—Kevin Verbrugge
(74) Attorney, Agent, or Firm—Alan K. Aldous (57) ABSTRACT

In some embodiments, the invention includes a snoop filter, wherein entries in the snoop filter are allocated in response to initial accesses of local cache lines by a remote node, but entries in the snoop filter are not allocated in response to accesses of the local cache lines by a local node. Other embodiments are described and claimed.

28 Claims, 5 Drawing Sheets

PARTIALLY INCLUSIVE SNOOP FILTER

RELATED APPLICATION

U.S. patent application Ser. No. 09/643,382, "Method and Apparatus for Centralized Snoop Filtering," filed Aug. 21, 2000, pending, is of related subject matter.

BACKGROUND OF THE INVENTION

1. Technical Field of the Invention

The present invention relates to computer systems and, more particularly, to a multi-node computer system with a snoop filter.

2. Background Art

Large multi-processor computer systems are often organized in nodes in which at least some of the nodes include main memory, some number of processors and associated caches. Multiple processors can access and modify a cache line. An access is a read or write transaction (request) with respect to the cache line. A write request may be handled in directly such as through a read for ownership. A cache coherency protocol allows the processors to use the most recently updated version of the cache line. A popular cache coherency protocol is the MESI (modified, exclusive, shared, or invalid) protocol. There are various variants of the MESI protocol.

Figure 1:
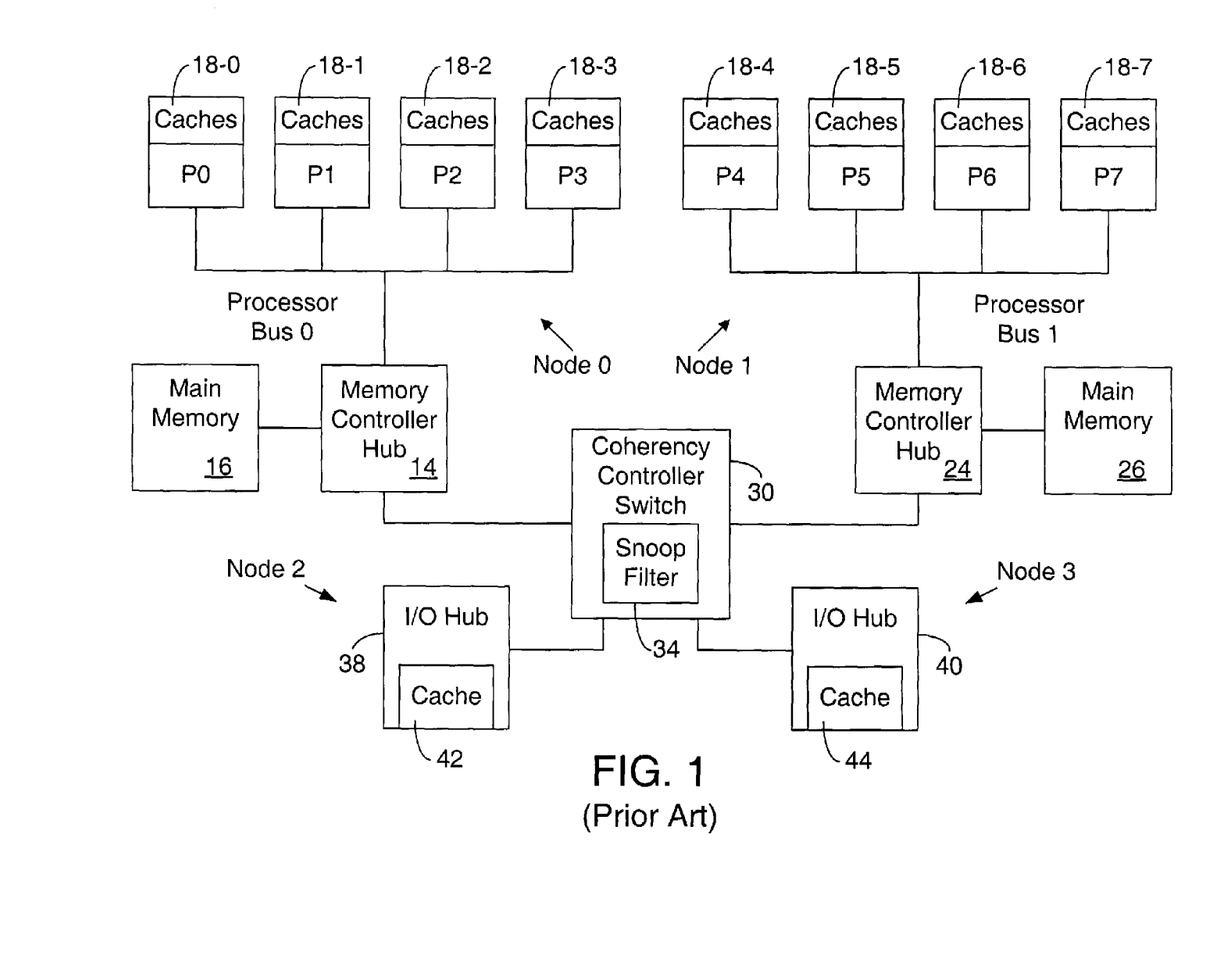
FIG. 1 is a block diagram representation of prior art multi-node system.

Snoop filters/directories have been designed to help maintain cache coherency between nodes. For example, FIG. 1 illustrates a multi-node processor system including a node 0 and a node 1. Multi-node systems may include more than two nodes. Node 0 includes a processor bus 0 (sometimes called a front side bus), four processors P0, P1, P2, and P3, a memory controller hub 14, and main memory 16. The processor bus has been a multi-drop bus, but using a point-to-point interconnect bus has been suggested. Node 1 includes a processor bus 1, four processors P4, P5, P6, and P7, a memory controller hub 24, and main memory 26. Processors P0, P1, . . . P7 have corresponding caches 18-0, 18-1, . . . 18-7. For some processors, the caches are called L0, L1, and L2 caches, but the names are not important and there may be more or less than three caches per processor. The L2 caches may be on the same die as the processor or on a different die. A coherency controller switch 30 is coupled between memory controller hubs 14 and 24 as well as I/O hub 38 and I/O hub 40. Memory controller hubs 14 and 24 are sometimes referred to as a North bridge. Memory controller hub 14 is the local (home) memory controller hub for node 0 and memory controller hub 24 is the local memory controller hub for node 1. I/O hubs 38 and 40 are sometimes referred to as South bridges. I/O hubs 38 and 40 also have caches 42 and 44 respectively. The caches of the I/O hubs and the caches of the processors are called caching agents.

An individual node include circuitry to maintain cache coherency inside that node through a cache coherency protocol such as the MESI protocol or a variant of it. For example, the circuitry to maintain cache coherency in node 0 is distributed amongst interfaces for memory controller hub 14 and processors P0-P3.

Coherency controller switch 30 routes transactions between nodes, tracks requests, and broadcasts snoops. Cache controller switch 30 includes a snoop filter 34. Snoop filter 34 tracks the state and location of cache lines held in the processor caches and I/O hub caches. A benefit of the snoop filter is to eliminate the need to broadcast unneeded snoop requests to all caching agents, thus reducing latency of coherent memory accesses, decreasing bandwidth utilization, and improving system performance. If an access is made that is a miss in snoop filter 34, a memory read is issued to the local memory controller hub, and a location in snoop filter 34 is allocated to track the cache line. It is safe to fetch data from memory without snooping the processor bus.

Due to the finite number of entries, a miss in snoop filter 34 may indicate there are no available entries. In such a case, a victim entry will be selected for eviction/back invalidation. A drawback of snoop filter 34 is that it must be sized to match the cumulative size of all the caches in the system to be effective. If the snoop filter is not sized appropriately then the processor caches will receive an excessive number of back invalidates due to frequent replacements in the snoop filter. This will limit the cache utilization of the processors resulting in the system under performing.

Snoop filter 34 may include multiple snoop filters that are physically different. For example, one snoop filter could be for even cache lines and another could be for odd cache lines. The multiple snoop filters do not have to be in a centrally located snoop filter, but rather may be distributed (e.g., in memory controller hubs and/or in memory interfaces integrated with the processor). In a uniform memory access (UMA) system, all memory locations have an essentially equal access time for each processor.

In a non-uniform memory access (NUMA) system, memory locations (addresses of cache lines) are shared by the processors, but some memory locations are accessed more quickly by some processors than by others. For example, in FIG. 1, processors in node 0 can access locations in main memory 16 more quickly than processors in node 0 can access locations in main memory 26. Further, a particular range of memory locations may be assigned to node 0 and another range may be assigned to node 1. The programmer of the operating system (OS) or other programs may take advantage of this locality by having processors in node 0 tend to use the memory location in the range associated with node 0 and processors in node 1 tend to use the memory locations in the range associated with node 1.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

Figure 2:
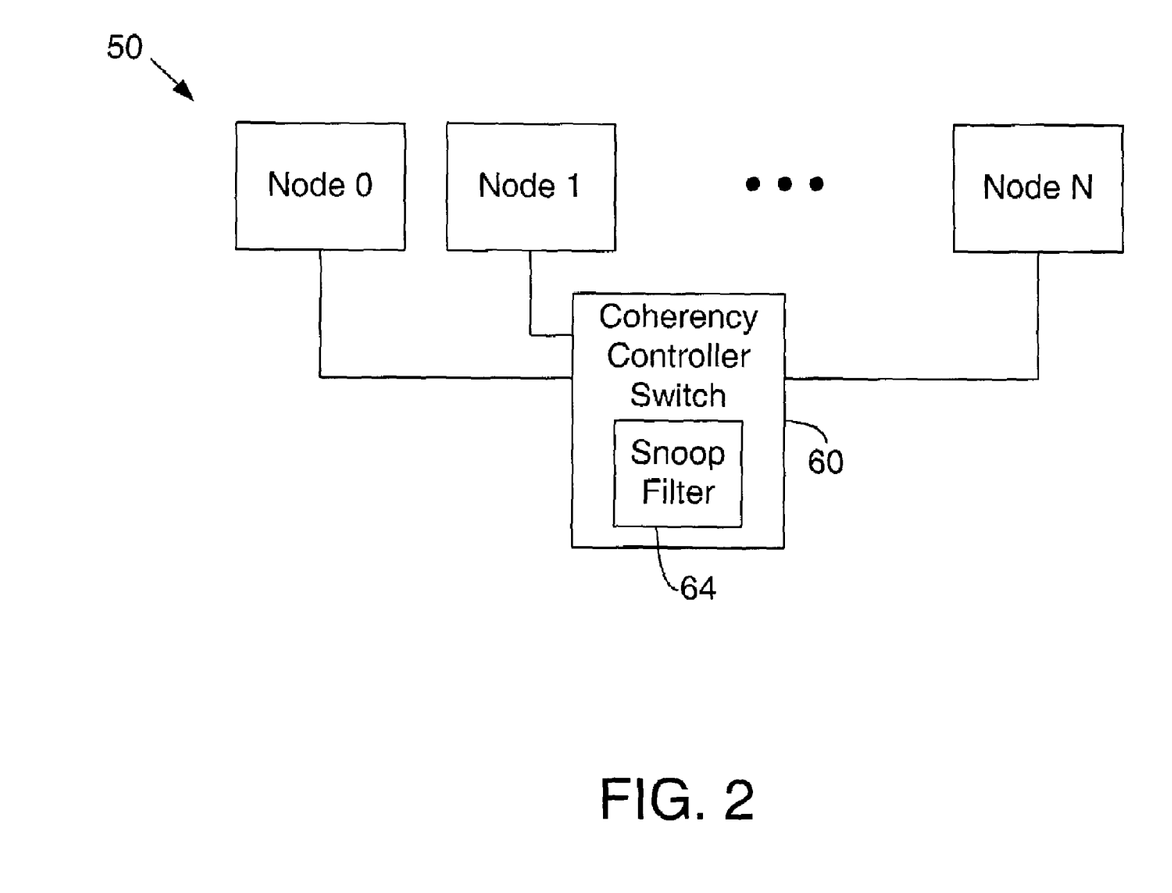
FIG. 2 is a block diagram representation of multi-node system according to some embodiments of the invention.

Referring to FIG. 2, a multi-node computer system 50 includes nodes 0, 1 . . . N, and a coherency controller switch 60 coupled between the nodes. Coherency controller switch 60 routes transactions between nodes, tracks requests, and broadcasts snoops. Coherency controller switch 60 includes a snoop filter 64. The invention is not limited to particular details for nodes 0 . . . N or to a particular number of nodes. System 50 may be a NUMA system.

Figure 3:
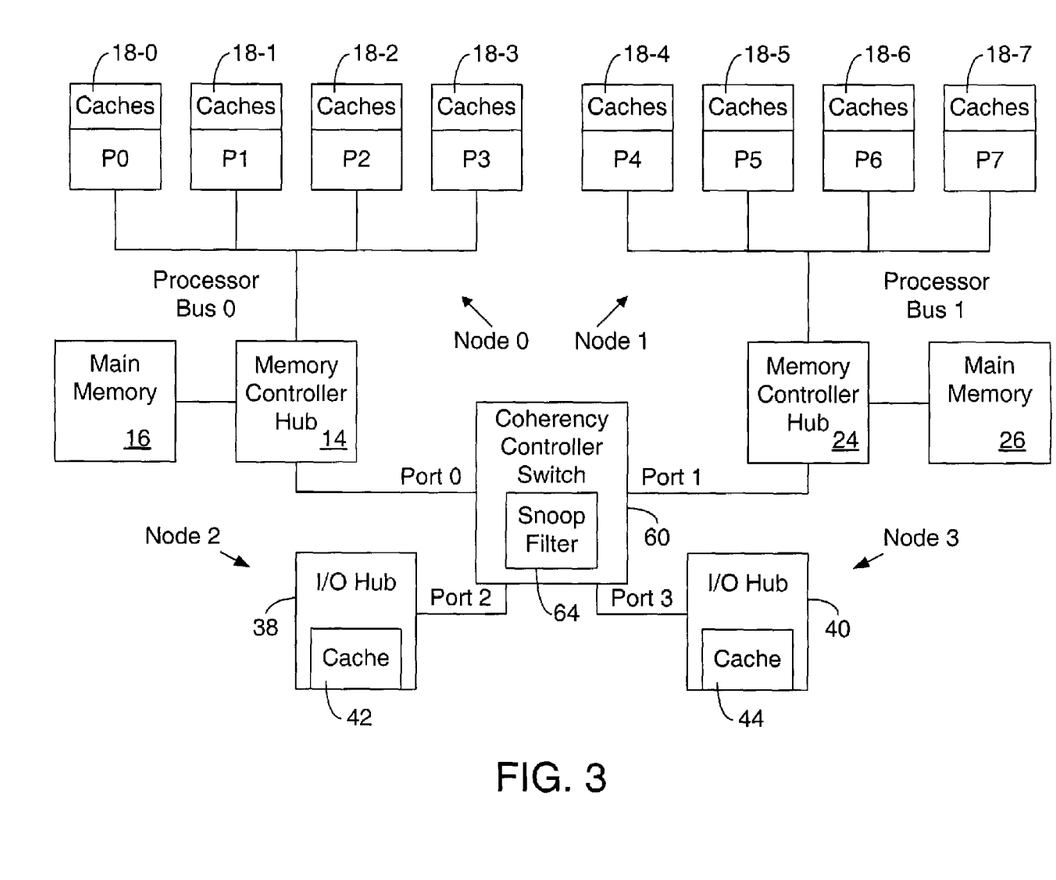
FIG. 3 is a block diagram representation of multi-node system according to some embodiments of the invention.

FIG. 3 illustrates details of some embodiments of nodes, but the invention is not limited to these details. FIG. 3 illustrates only nodes 0, 1, 2, and 3, but there may be additional nodes. Further, system 50 may include other circuitry that is not illustrated in FIG. 3. Node 0 is a multi-processor node that includes memory controller hub 14, main memory 16, a processor bus 0, processors P0, P1, P2, and P3 with corresponding caches 18-0, 18-1, 18-2, and 18-3. Likewise, node 1 includes memory controller hub 24, main memory 26, a processor bus 1, processors P4, P5, P6, and P7 with corresponding caches 18-4, 18-5, 18-6, and 18-7. Caches 18-0 . . . 18-7 are not restricted to a particular type of cache or cache protocols. Node 2 includes I/O hub 38 and node 3 includes I/O hub 40. Processor buses 0 and 1 may be multi-drop buses or point-to-point interconnect buses. Nodes 2 and 3 might also be considered to include additional I/O devices (not illustrated) that are coupled to I/O hubs 38 and 40. It is not required that nodes 0 and 1 be identical or that nodes 2 and 3 be identical.

Nodes 0, 1, 2, and 3 interface to coherency controller switch 60 through ports 0, 1, 2, and 3, respectively.

The nodes may include circuitry to maintain cache coherency through the MESI protocol or a variant of it within the node. For example, node 0 may include circuitry distributed in interfaces of memory controller hub 14 and interfaces of processors P0 to P3 to maintain cache coherency within node 0.

Figures 4, 5:
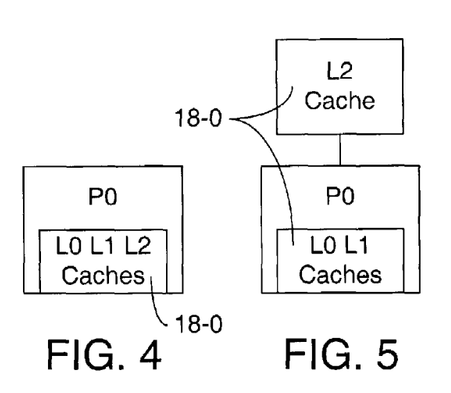
FIG. 4 is a block diagram representation of caches in a processor die that may be used in some embodiments of the invention.
FIG. 5 is a block diagram representation of caches in and associated with a processor die that may be used in some embodiments of the invention.

Merely as an example and not a limitation, FIG. 4 illustrates L0, L1, and L2 caches (making up cache 18-0) on the same die as processor P0. FIG. 5 illustrates the L2 cache as being on a different die than processor P0. The invention is not limited to systems that include L0, L1, and L2 caches.

In some embodiments, each node has a particular address range of cache lines assigned to it. That is, each cache line is assigned to a particular node. The node to which a cache line is assigned is referred to as its local node (or home node). Other nodes are remote nodes with respect to the cache line.

Snoop filter 64 tracks the state and location of cache lines held in the processor caches and I/O hub caches. A benefit of the snoop filter is to eliminate the need to broadcast unneeded invalidates to all caching agents, thus reducing latency of writes, decreasing bandwidth utilization, and improving system performance.

The operation of coherency controller switch 60 and snoop filter 64 in FIGS. 2 and 3 differs from that of prior art coherency controller switch 30 and snoop filter 34 in FIG. 1 in the following ways. In the case of the prior art system in FIG. 1, when either a local node or a remote node makes an access to a cache line, snoop filter 34 is consulted. If there is not an entry in snoop filter 34 for the cache line (i.e., a miss), an entry is allocated for the cache line in snoop filter 34. If there is already an entry for the cache line in snoop filter 34 (i.e., a hit), then appropriate snoops are made and communicated and the entry in snoop filter 34 is updated according to the MESI protocol or a variant of it. Accordingly, all accesses to a cache line whether by remote or local nodes are tracked by snoop filter 34.

The following are three way in which the operation of coherency controller switch 30 and snoop filter 34 differs from that of coherency controller switch 60 and snoop filter 64.

1. An entry in snoop filter 64 is not allocated in response to an access of a local cache line by a local node (home node). However, when a local node accesses a local cache line, snoop filter 64 is consulted to see if there is already an entry for the local cache line. If there is not already an entry in snoop filter 64 (a miss), a remote node has not accessed the cache line and the access by the local node will continue without allocating an entry in snoop filter 64. A remote snoop is not needed. If there is already an entry in snoop filter 64 (a hit), it is because a remote node (non-home node) has already accessed the local cache line and the access by the local node is tracked in snoop filter 64 by an appropriate updating of the entry according to the MESI protocol or a variant of it. Appropriate snoops of remote nodes are made according to the MESI protocol or a variant of it and snoop responses are collected. Accordingly, not all accesses of a cache line are tracked by snoop filter 64, but only those accesses of the cache line that are made by a remote node or that are made by a local node when there is already an entry in snoop filter 64 because of previous access by a remote node.

For example, assume cache line X is assigned to node 0 and an entry is not allocated in snoop filter 64 for cache line X. Accordingly, cache line X is local with respect to node 0, node 0 is the local node, and nodes 1, 2, and 3 are remote nodes. If node 0 accesses cache line X, an entry is not allocated in snoop filter 64 for cache line X and the allocation continues. Now assume cache line X is assigned to node 0 and an entry has already been allocated in snoop filter 64 for cache line X because node 1 has accessed it. In that case, future accesses of cache line X by node 0 are tracked by snoop filter 64 with appropriate snoops, collection of snoop responses, and updating of the entry.

2. If a remote node accesses a local cache line where it misses in snoop filter 64, a cacheable access (read with snoop) is issued by coherency controller switch 60 to the local node. In the cacheable access, there is a snoop of the local processor bus and a memory read to the memory of that node. The snoop of the local processor bus is made because the cache line may be modified in a cache of one of the processors of the local node. Any modification to the cache line by the local node would not be reflected in snoop filter 64 because an entry was not previously allocated for that cache line. By contrast, in the prior art system of FIG. 1, if the local cache line had been previously been accessed by the local node that would have been tracked in the snoop filter and main memory 16 could be accessed directly without checking the processor bus.

For example, assume cache line X is assigned to node 0. If node 1 accesses cache line X and there is a miss in snoop filter 64 (i.e., there is no entry for cache line X in snoop filter 64), then an entry is created for cache line X in snoop filter 64 and a cacheable access is issued to processor bus 0 and main memory 16 instead of merely a direct read to main memory 16. In response to the cacheable access, processor bus 0 checks the caches of node 0 (e.g., caches 18-0, 18-1, 18-2, and 18-3) to determine which, if any, of them have or have modified cache line X. Further, memory controller hub 14 checks main memory 16. The check to main memory 16 may be performed speculatively at the same time as the check to the caches of bus 0 or it may be performed after the check of the caches is unsuccessful. Processor bus 0 performs cache coherency according to the MESI protocol or some variant of it. At the completion of the request of cache line X by node 1, an appropriate update to snoop filter 64 is made to reflect what has occurred. In some embodiments, if the request from node 1 is a write back of cache line X, the operation may be completed by writing into the home memory location in node 0 without a snoop to processor bus 0, where the MESI protocol guarantees only one unique modified owner in the system at a time.

3. A third difference concerns the case in which a local node makes a read for ownership access (a type of write) to a local cache line. If there is a miss in snoop filter 64, the read for ownership continues. If there is a hit in snoop filter 64 (because there is an entry for the cache line), a snoop invalidate request (such as a snoop invalidate own line (PSILO)) is issued to any remote owner(s).

A cache line may be de-allocated so that the entry for the cache line is removed from snoop filter 64. Even though there has previously been an entry for the cache line in the snoop filter, for purposes of the operations described herein, when the cache line is again accessed it will be treated as if it were the first time it was accessed. If the cache line is next accessed by its local node, an entry will not be allocated and the access will not be tracked by snoop filter 64. However, accesses by the local node will again be tracked after the cache line is again accessed by a remote node.

The invention can allow a snoop filter of a given size to effectively cover a larger cache than in the prior art example. As an example, in a system with two nodes where memory accesses are equally distributed (i.e., 50% local and 50% remote), this protocol change would approximately double the coverage of the snoop filter. As NUMA optimizations are made to the operating systems by having a node tend to use cache lines assigned to it so that the ratio of local to remote access increases a fixed snoop filter size increases its ability to effectively cover larger and larger caches.

When there is an eviction of one of the cache lines in the snoop filter, there are at least two approaches regarding back invalidating. Under a first approach, that cache line is back invalidated for all nodes. Under a second approach, that cache line is back invalidated for all nodes except the node that is the local node for that cache line.

The nodes include circuitry to maintain cache coherency within the node. That circuitry may be distributed amongst interfaces for the node's memory controller hub and processors.

Figure 6:
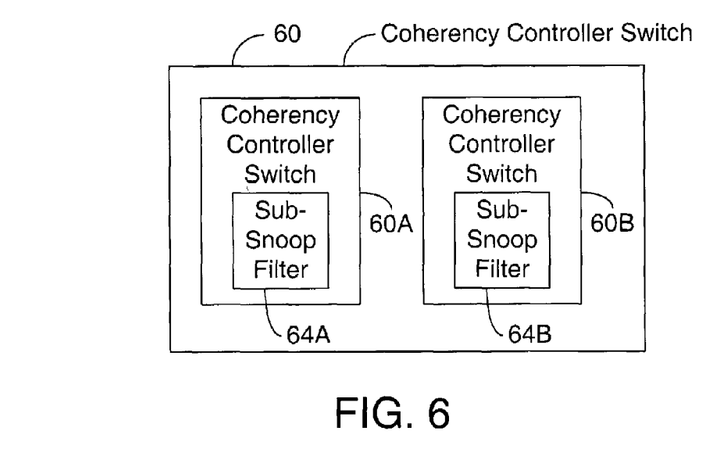
FIG. 6 is a block diagram representation of multiple coherency controller switches and sub-snoop filters according to some embodiments of the invention.
Figure 9:
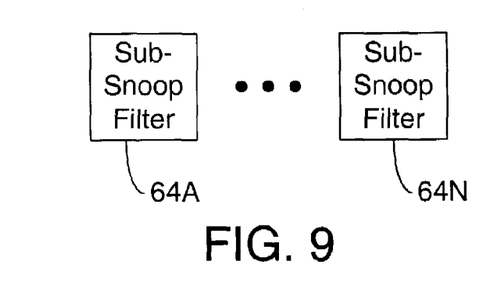
FIG. 9 is a block diagram representation of sub-snoop filters.

FIG. 6 illustrates that coherency controller switch 60 may represent more than one snoop filter and corresponding coherency controller switch. For example, in FIG. 6, coherency controller switch 60 includes a sub-snoop filter 64A for even cache lines and a sub-snoop filter 64B for odd cache lines with corresponding coherency controller switches 60A and 60B. Cache lines may be divided in some way other than even/odd in sub-snoop filters 64A and 64B. A sub-coherency controller switch 60A may be on the same die or on a different die than sub-coherency controller switch 60B. If sub-coherency controller switches 60A and 60B are on the same die, coherency controller switch 60 may have some additional circuitry shared by both switches 60A and 60B. There may be more than two sub-snoop filters. FIG. 9 shows sub-snoop filters 64A . . . 64N, wherein N may be the number of nodes, twice the number of nodes or some other number. The sub-snoop filters do not have to be divided according to even and odd cache lines. The snoop filters may be in the memory controller hubs and/or in another place in a node such as a processor die and I/O hub die. Some functions of coherency controller switch 60 may be performed in a central location, while other functions of it are performed elsewhere such as near snoop filters in the nodes.

Figure 10:
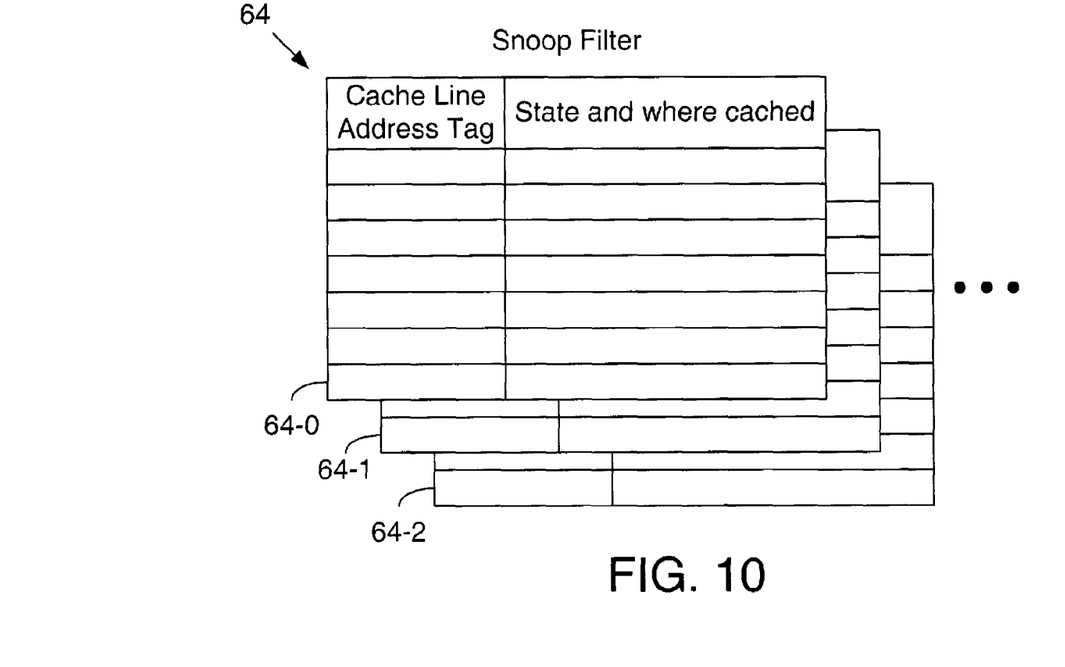
FIG. 10 is a schematic representation of a snoop filter that may be used in some embodiments of the invention.

The snoop filter may be implemented in a variety of ways and the invention is not restricted to particular details for the snoop filter. The snoop filter will include a field or fields to indicate the cache line address, the state of the cache line, and where the node or nodes, if any, in which the cache line is cached. As an example, various features of snoop filter 64 are illustrated in FIGS. 7, 8, 9, and 10, although the invention is not limited to these details. Referring to FIG. 10, snoop filter 64 includes multiple lists 64-0, 64-1, 64-3 . . . 64-X of coherency information about cache lines. Merely as an example, snoop filter 64 might be 12-way set associative in which case there could be twelve coherency lists 64-0, 64-1, . . . 64-11.

Figures 7, 8:
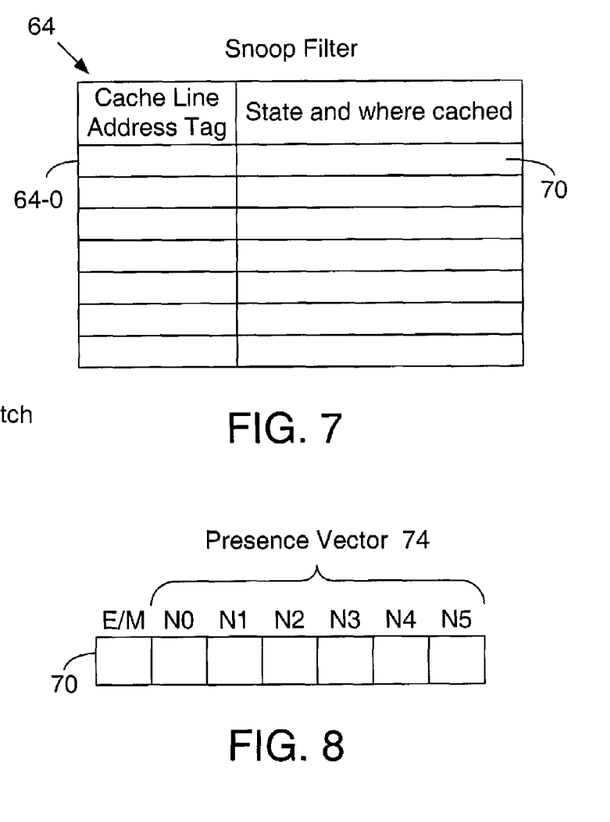
FIG. 7 is a schematic representation of coherency list in a snoop filter that may be used in some embodiments of the invention.
FIG. 8 is a schematic representation of an E/M bit and a coherency presence vector that may be used in some embodiments of the invention.

FIG. 10 illustrates coherency list 64-0 of snoop filter 64. In this particular embodiment, an address is divided into a tag (which is an upper part of the address) and an index (which is a lower part of the address). The index is "built-in" to the rows of coherency list 64-0. There are many more rows than are shown in FIGS. 7 and 10. A cache line is stored in one of the coherency lists 64-0 . . . 64-X that has a row with the same index as the cache line. The tag of the cache line is put in the "cache line address tag" field of the row. If all lists are occupied with that index, various algorithms such as least recently used (LRU) algorithms can be used in deciding in which list the cache line will be held. In some embodiments, particular coherency lists are dedicated to cache lines for a particular node or nodes, but it may be more efficient to allow any cache line to be in any coherency list.

The coherency lists of snoop filter 64 also include other fields under the heading "State and where cached" in FIG. 7. One example of the "State and where cached" fields are fields 70 shown in FIG. 8, which include an E/M (exclusive/ modified) bit and a presence vector 74. In the example of FIG. 8, there are 6 bits in the presence vector 74, one corresponding to each node in the system. In FIG. 3, only four nodes, but there may be six nodes (four processor nodes and two I/O hub nodes). If there are more or less nodes in the system, there would be a corresponding number of bits in the presence vector. In FIG. 8, the bits in presence vector 74 are labeled N0, N1 . . . N5 to represent nodes 0, 1, . . . 5 in the system of FIG. 3. Nodes 0-N are sometimes referred to as ports from the perspective of coherency controller switch 60. Accordingly, the bits in the presence vector might be labeled ports 0, 1, . . . 5 to represent nodes 0-5. In FIG. 3, only nodes 0, 1, 2, and 3 are shown. Nodes 4 and 5 might be processor nodes like nodes 0 and 1. Alternatively, the I/O hubs could be nodes 4 and 5 and nodes 2 and 3 could be reassigned to processor nodes.

A first logical value for the E/M bit indicates the cache line is the non-exclusive/ non-modified state and a second logical value in the E/M bit indicates the cache line is in the exclusive/modified state. In the following examples, the first logical value for the E/M bit is 0 (low) and the second logical value is 1 (high), although the opposite could be used. A first logical value for a bit of presence vector 74 indicates the corresponding node has not cached the cache line of interest. Accordingly, if all six bits of presence vector 74 have the first logical value, it A second logical value indicates the corresponding node has cached the cache line. In the following examples, the first value is 0 (low) and the second value is 1 (high), although the opposite could have been used.

A first logical value in the node bits of presence vector 74 indicates the corresponding node has not cached the cache line of interest. A second logical value indicates the corresponding node has cached the cache line. In the following examples, the first value is 0 (low) and the second value is 1 (high), although the opposite could have been used.

The following are some examples as to operation of snoop filter 64 according to some embodiments of the invention. However, the invention is not limited to these details. The following examples assume bits N0, N1, N2, and N3 in presence vector 74 represent nodes 0, 1, 2, and 3 in FIG. 3, respectively, and there are two additional nodes N4 and N5 that are not illustrated in FIG. 3.

In a first example, there is a data read transaction requested by node 0 of a cache line X which is not cached in any of the node's caches. Cache line X is in the range assigned to node 1, so that node 1 is the local node. Node 0 issues a read request to coherency controller switch 60. Snoop filter 64 performs a lookup operation to determine if cache line X has been cached at any of the nodes 0-5. In some embodiments, while the snoop filter 64 is performing the lookup operation, coherency controller switch 60 issues a speculative memory read to node 1. Coherency controller switch 60 may include memory decode circuitry to allow it to determine which node is being addressed by the read request. In this example, snoop filter 64 indicates that cache line X is not cached in any of the system's caches. Accordingly, a 0 is included in N0-N5 in presence vector 74 or an entry for cache line X is not in snoop filter 64. Coherency controller switch 60 delivers a snoop response to node 0 and may also send a memory read confirmation to node 1. In response to the memory read confirmation, node 1 delivers the requested data to coherency controller switch 60. Coherency controller switch 60 then delivers the requested data to node 1. Because node 1 is the only node that has cached the subject cache line, snoop filter 64 marks the E/M bit accordingly and the N0 bit to 1 to indicate that node 0 has a copy of the cache line.

In a second example, a memory read for ownership (processor write) transaction involves a cache line Y shared between nodes 0 and 1. In this example, cache line Y is in the range of node 0 so node 0 is the local node. Node 0 is also the requesting node. In other words, node 0 is writing a cache line to its own memory 16. Node 0 begins by issuing an invalidate cycle to coherency controller switch 60. Snoop filter 64 then performs a lookup operation to determine which nodes have copies of cache line Y and also to determine in which state cache line Y is cached. The lookup operation in this example indicates that cache line Y is "shared" and that nodes 1 and 2 have copies. Accordingly, the N1 and N2 bits have a 1 while the N0 and N3-N5 bits have a 0. Switch 60 then issues invalidate cycles to nodes 1 and 2. Nodes 1 and 2 respond with snoop response signals and coherency controller switch 60 delivers a snoop response to node 0 to complete the transaction. Snoop filter 64 now shows that node 0 has the only copy of the cache line and that the line is in the "exclusive/modified" state. Accordingly, the E/M bit has a 1 and the N0 bit has a 1 while the N1-N5 bits have a 0. In some embodiments, the snoop filter entry can be de-allocated at the end of the read for ownership transaction where the local node is the sole owner of the cache line.

A third example involves a read cycle to a "modified" cache line Z which is in the memory range of node 1, so node 1 is the local node. Node 0 is the requesting node and node 2 is the node that has modified its copy of cache line Z. Node 0 begins the transaction by issuing a read request to coherency controller switch 60. Snoop filter 64 performs a lookup operation while the coherency controller switch 60 issues a speculative memory read to node 1. The result of the snoop filter lookup indicates that node 2 has a modified copy of cache line Z. Coherency controller switch 60 sends a snoop request to node 2 and node 2 responds with a snoop response along with the modified data. Coherency controller switch 60 delivers the snoop response and the data to node 0 and at the same time delivers the data to node 1 so that the system memory can be updated. Node 1 then signals a completion to coherency controller switch 60 and the completion is forwarded from switch 60 to node 0 to complete the transaction.

Presence vector 70 and 74 has been described the E/M bits and presence vector bits N0-N5 as being single bit with 0 or 1 logical values. Alternatively, the state information could be encoded in cells that allowed more than two logical values (e.g., voltages).

In some embodiments, the above-described new techniques for dealing with accesses of local cache lines by local and remote nodes apply to all cache lines and all nodes. In other embodiments, the new techniques might apply to only some of the cache lines and/or only some of the nodes, wherein for others of the cache lines and/or others of the nodes, other techniques such as allocating entries for all initial accesses may apply. In some embodiments, some of the new techniques apply while others of them do not. As an example of alternative embodiments, for some or all nodes, an entry would be allocated for initial accesses of some local caches lines by the local node, but for other cache lines, one or more of the new techniques would apply. As another example, accesses by some nodes would be treated in the new way, but accesses by others of the nodes would be treated in the prior art way. Various combinations of new and old techniques may be used.

When comparing FIG. 3 and FIG. 1, only the coherency controller switch and snoop filter have different reference numbers. That illustrates that the other components in the figures can be constructed and operated the same in the prior art system and in the system of FIG. 3. However, other components (e.g., memory controller hubs 14 and 24) could be different in FIGS. 1 and 3.

The interconnects between components shown in drawings or described herein (e.g., between switch 60 and the nodes) may be made through electrical, optical, or wireless techniques, or through some other technique of communication.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The invention is not restricted to the particular details listed herein. Indeed, those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. An apparatus comprising:
   a snoop filter, wherein entries in the snoop filter are allocated in response to initial accesses of local cache lines by a remote node, but entries in the snoop filter are not allocated in response to accesses of the local cache lines by a local node, wherein the snoop filter includes multiple coherency lists.

2. The apparatus of claim 1, wherein the snoop filter tracks accesses to cache lines including the local cache lines after there are entries for the cache lines in the snoop filter.

3. The apparatus of claim 1, wherein the snoop filter includes at least first and second sub-snoop filters.

4. The apparatus of claim 1, wherein the snoop filter includes a presence vector to represent nodes.

5. The apparatus of claim 1, wherein the snoop filter includes exclusive/modified E/M bits to partially indicate cache line states.

6. The apparatus of claim 1, further comprising a coherency controller switch including the snoop filter and wherein the coherency controller switch issues a cacheable access to the local node if the remote node accesses one of the local cache lines for which there is not previously an entry in the snoop filter.

7. The apparatus of claim 1, further comprising a coherency controller switch including the snoop filter and wherein the coherency controller switch issues a snoop invalidate request if the local node makes a read for ownership access to one of the local cache lines and there is a hit in the snoop filter.

8. The apparatus of claim 1, further comprising a coherency controller switch including the snoop filter and wherein the snoop filter includes a first sub-snoop filter for even cache lines and a second snoop filter for odd cache lines and wherein the coherency controller switch includes a first sub-coherency controller switch associated with the first sub-snoop filter and a second sub-coherency controller switch associated with the second sub-snoop filter.

9. The apparatus of claim 1, wherein the snoop filter includes at least first and second sub-snoop filters each including multiple coherency lists.

10. A system comprising:
    a local node with respect to local cache lines;
    a remote node with respect to the local cache lines; and
    sub-snoop filters, wherein for each of the sub-snoop filters, entries are allocated for initial accesses of local cache lines by the remote node, but entries are not allocated for accesses of the local cache lines by the local node.

11. The system of claim 10, further comprising a coherency controller switch to issue a cacheable access to the local node if the remote node accesses one of the cache lines for which there is not previously an entry in a corresponding one of the sub-snoop filters.

12. The system of claim 10, further comprising a coherency controller switch to issue a snoop invalidate request if the local node makes a read for ownership access to one of the local cache lines and there is a hit in a corresponding one of the snoop filters.

13. The system of claim 10, wherein at least one of the sub-snoop filters is in the local node and at least one of the sub-snoop filters is in the remote node.

14. A system comprising:
    a local node with respect to local cache lines;
    a remote node with respect to the local cache lines; and
    a snoop filter, wherein entries in the snoop filter are allocated for initial accesses of the local cache lines by the remote node, but entries in the snoop filter are not allocated for accesses of the local cache lines by the local node; and
    a coherency controller switch including the snoop filter to issue a cacheable access to the local node if the remote node accesses one of the cache lines for which there is not previously an entry in the snoop filter.

15. The system of claim 14, wherein the snoop filter tracks accesses to cache lines after there are entries for the cache lines in the snoop filter.

16. The system of claim 14, in which the coherency controller switch is to issue a snoop invalidate request if the local node makes a read for ownership access to one of the local cache lines and there is not a hit in the snoop filter.

17. The system of claim 14, wherein if there is a miss in the snoop filter in response to an access by the local node, the access continues.

18. The system of claim 14, and wherein the snoop filter includes a first sub-snoop filter for even cache lines and a second snoop filter for odd cache lines and wherein the coherency controller switch includes a first sub-coherency controller switch associated with the first sub-snoop filter and a second sub-coherency controller switch associated with the second sub-snoop filter.

19. The system of claim 14, wherein the snoop filter includes at least first and second sub-snoop filters each include multiple coherency lists.

20. The system of claim 14, wherein in response to any miss in the snoop filter, the cache coherency switch causes a snoop of caches of the local node.

21. The system of claim 14, wherein in response to any hit in the snoop filter and a presence vector bit for the local node is set, the cache coherency switch causes a snoop of caches of the local node.

22. The system of claim 14, wherein in response to any hit in the snoop filter and a presence vector bit for the local node is not set, the cache coherency switch does not cause a snoop of caches of the local node.

23. The system of claim 14, wherein there are additional remote nodes with respect to the local cache lines and there are remote cache lines with respect to the local node that are local with respect to the remote nodes and wherein an entry is allocated in the snoop filter for an initial access of a particular one of the cache lines by any of the nodes that are remote with respect to the particular one of the cache lines, but not by one of the nodes that is the local node for that particular one of the cache lines.

24. The system of claim 14, wherein if there is an eviction of one of the cache lines in the snoop filter, that one of the cache lines is back invalidated for all nodes.

25. The system of claim 14, wherein if there is an eviction of one of the cache lines in the snoop filter, that one of the cache lines is back invalidated for all nodes except the node that is the local node for that one of the cache lines.

26. The system of claim 14, wherein the local cache lines are all the local cache lines.

27. The system of claim 14, wherein there are additional local cache lines for which an entry in the snoop filter is allocated in response to an initial access by the local node.

28. The system of claim 14, wherein the local node includes a local processor bus that maintains a coherency protocol for accesses of the local cache lines by the local node.

* * * * *